(12) United States Patent
Ritz

(10) Patent No.: US 10,941,694 B2
(45) Date of Patent: Mar. 9, 2021

(54) CLOSABLE AIR GUIDING DEVICE ON A VEHICLE AND MEDHOD OF CONTROLING AIR FLOW IN PROXIMITY TO FRONT COWLING OF A VEHICLE

(71) Applicant: Dr. Ing. h.c. F. Porsche Aktiengesellschaft, Stuttgart (DE)

(72) Inventor: Thomas Ritz, Nufringen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 747 days.

(21) Appl. No.: 14/558,973

(22) Filed: Dec. 3, 2014

(65) Prior Publication Data

US 2015/0152774 A1 Jun. 4, 2015

(30) Foreign Application Priority Data

Dec. 4, 2013 (DE) ...................... 10 2013 113 489.0

(51) Int. Cl.
  *F01P 1/06* (2006.01)
  *F01P 7/10* (2006.01)
  (Continued)

(52) U.S. Cl.
  CPC .............. *F01P 1/06* (2013.01); *B60K 11/085* (2013.01); *F01P 7/10* (2013.01); *B60K 11/04* (2013.01); *Y02T 10/88* (2013.01)

(58) Field of Classification Search
  CPC ......... B60K 11/00; B60K 11/04; B60K 11/08; B60K 11/085; F01P 3/00; F01P 7/12; F01P 7/00; F01P 1/06; B62D 35/00
  (Continued)

(56) References Cited

U.S. PATENT DOCUMENTS 4,457,558 A * 7/1984 Ishikawa .............. B60K 11/085
  123/41.05
4,534,506 A * 8/1985 Ishida .................. B60K 11/085
  123/41.05

(Continued)

FOREIGN PATENT DOCUMENTS

DE           3019599      12/1980
DE    10 2009 020 352    11/2010
(Continued)

OTHER PUBLICATIONS

Cheeseman, WO2014/060281A1 English machine translation, Apr. 24, 2014 (Year: 2014).*

(Continued)

*Primary Examiner* — Kenneth J Hansen
*Assistant Examiner* — Phillip Decker
(74) *Attorney, Agent, or Firm* — Gerald E. Hespos; Michael J. Porco; Matthew T. Hespos

(57) ABSTRACT

An air guiding device is provided for regulating air flow through at least one air inlet opening in a front cowling of a vehicle. The at least one air inlet opening is arranged laterally in the front cowling and, in a closed state, is covered completely to the outside by the air guiding device. The air guiding device has a retaining frame and slats arranged movably in the retaining frame. The slats are mounted movably in the retaining frame and the angle of incidence of the slats can be changed by a servo motor that is connected to an adjusting mechanism, in such a manner that an air flow approaching the at least one air inlet opening is at least partially guided around the vehicle. A method also is provided for regulating an air flow in proximity to the front cowling of a vehicle.

5 Claims, 4 Drawing Sheets

(51) Int. Cl.
*B60K 11/08* (2006.01)
*B60K 11/04* (2006.01)

(58) Field of Classification Search
USPC ..... 180/68.1, 68.2, 68.6; 296/193.09, 180.5; 236/35.3; 454/155
See application file for complete search history.

(56) References Cited

U.S. PATENT DOCUMENTS

| | | | | |
|---|---|---|---|---|
| 4,779,577 A | * | 10/1988 | Ritter | F01P 7/02 123/41.05 |
| 5,669,311 A | * | 9/1997 | Hill | B61O 5/02 105/26.05 |
| 6,347,987 B1 | * | 2/2002 | Ichishi | B60H 1/247 454/153 |
| 6,997,389 B2 | * | 2/2006 | Demster | E04B 9/02 165/269 |
| 7,766,111 B2 | * | 8/2010 | Guilfoyle | B60K 11/04 180/68.1 |
| 8,181,727 B2 | * | 5/2012 | Ritz | B60K 11/085 180/68.1 |
| 8,311,708 B2 | * | 11/2012 | Kerns | F01P 7/10 701/101 |
| 8,443,921 B2 | * | 5/2013 | Charnesky | F01P 7/10 180/68.1 |
| 8,752,886 B2 | * | 6/2014 | Wirth | B60K 11/085 180/68.6 |
| 8,833,313 B2 | * | 9/2014 | Lockwood | B60K 11/085 123/41.04 |
| 9,567,015 B2 | * | 2/2017 | Wolf | B62D 35/007 |
| 9,598,058 B2 | * | 3/2017 | Cheeseman | B60T 5/00 |
| 9,657,632 B2 | * | 5/2017 | Abeska | F01P 7/12 |
| 10,377,430 B2 | * | 8/2019 | Wolf | B60K 11/06 |
| 2010/0139583 A1 | * | 6/2010 | Klotz | B60K 11/085 123/41.04 |
| 2010/0282438 A1 | * | 11/2010 | Wirth | B60K 11/085 165/67 |
| 2012/0022742 A1 | | 1/2012 | Nemoto | |
| 2012/0090906 A1 | * | 4/2012 | Charnesky | B60K 11/085 180/68.1 |
| 2012/0100791 A1 | * | 4/2012 | Charnesky | F01P 7/10 454/75 |
| 2013/0012115 A1 | * | 1/2013 | Schwarz | B60K 11/085 454/155 |
| 2013/0015378 A1 | | 1/2013 | Balsdon et al. | |
| 2013/0046445 A1 | * | 2/2013 | Nishimura | B60H 1/3208 701/49 |
| 2015/0136500 A1 | * | 5/2015 | Boom | B60K 11/085 180/68.1 |
| 2015/0149043 A1 | * | 5/2015 | MacFarlane | F01P 7/12 701/49 |

FOREIGN PATENT DOCUMENTS

| | | | | |
|---|---|---|---|---|
| DE | 1020098035362 | | 2/2011 | |
| DE | 10 2011 056 663 | | 6/2013 | |
| DE | 10 2012 218 744 | | 4/2014 | |
| GB | 2131150 A | * | 6/1984 | |
| GB | 2519161 | | 4/2015 | |
| GB | 2519161 A | * | 4/2015 | ........... B60K 11/085 |
| JP | 57-158171 | | 3/1956 | |
| JP | 04237686 A | * | 8/1992 | |
| JP | 06298132 A | * | 10/1994 | |
| JP | 2007320527 | | 12/2007 | |
| JP | 2012025175 | | 2/2012 | |
| JP | 2013226959 | | 11/2013 | |
| WO | 2011138910 | | 11/2011 | |
| WO | WO-2013161497 A1 | * | 10/2013 | ........... B60K 11/085 |
| WO | WO-2014060281 A1 | * | 4/2014 | ................ B60T 5/00 |

OTHER PUBLICATIONS

Furukoshi et al., WO 2013/161497 A1 English machine translation, Oct. 31, 2013 (Year: 2013).*
German Search Report dated Aug. 29, 2014.
Japanese Patent Appl. No. 2014-239855-Office Action dated Jul. 22, 2015.

* cited by examiner

CLOSABLE AIR GUIDING DEVICE ON A VEHICLE AND MEDHOD OF CONTROLING AIR FLOW IN PROXIMITY TO FRONT COWLING OF A VEHICLE

CROSS REFERENCE TO RELATED APPLICATION

This application claims priority under 35 USC 119 to German Patent Appl. No. 10 2013 113 489.0 filed on Dec. 4, 2013, the entire disclosure of which is incorporated herein by reference.

BACKGROUND

1. Field of the Invention

The invention relates to an air guiding device in a vehicle and to a method for closing an air inlet opening in a front cowling on a vehicle.

2. Description of the Related Art

Driving energy generally produces a high level of heat in vehicles both with the use of an internal combustion engine and an electric motor. The vehicle has to be cooled to dissipate or to reduce said waste heat. Heat exchangers or radiators frequently are used to cool vehicle and function by conducting a coolant over a large surface around which an ambient medium flows. The ambient medium absorbs thermal energy generated by the heat of the coolant. The ambient medium or air should flow as efficiently as possible around the surface of the radiator.

Cooling requirements vary during the operation of a vehicle depending on the power. Hence, it may appear expedient to limit an amount of approaching ambient medium. With respect to aerodynamic optimizations, unfavorably shaped receptacles, such as air inlet openings, may be obstructive to an ambient medium.

The prior art has already described devices for adapting air guiding devices to a respective cooling requirement of a vehicle.

US 2012/0090906 describes a ventilation system with first and second sections. The first section can move between open and closed positions. Furthermore, flaps are arranged in one of the two sections and optionally prevent or permit an ambient medium to flow therethrough. The flaps are movable from an open position into a closed position. Furthermore, the flaps are arranged behind a radiator grill of the vehicle so that the flaps are not visible to a person looking at the vehicle.

DE 10 2011 056 663 A1 describes a motor vehicle with at least one air guiding device that is extensible by a drive device and is adjustable between a maximally extended and a completely retracted position and at least one intermediate position. The motor vehicle has a cooling device with a radiator and a radiator shutter in front of the radiator. The shutter has adjustable cooling air flaps for controlling an air flow through the radiator or through the air inlet opening. A control device with adjustment elements is provided. The control device is designed so that the air guiding device is actuable as a function of a position of the radiator shutter in such a manner that an identical lift or an approximately identical pitching moment is produced at the motor vehicle independently of the position of the cooling air flaps of the radiator shutter.

SUMMARY OF THE INVENTION

The invention relates to an air guiding device for regulating an air flow flowing through at least one air inlet opening in a front cowling. At least one air inlet opening is arranged laterally in the front cowling and, in a closed state, should be completely covered to the outside by the air guiding device. The air guiding device comprises a retaining frame. At least one slat is arranged movably on the retaining frame and is visible from the outside. The at least one slat is mounted or arranged movably in the retaining frame and the angle of incidence of said slat can be changed by a servo motor that is connected to an adjusting mechanism. Thus, an air flow approaching the at least one air inlet opening is guided at least partially around the vehicle.

Aerodynamic effects are of central importance for vehicles that can achieve very high final speeds. A vehicle can be destabilized and a driver of the vehicle brought into a hazardous situation due to force associated with the enormous air flows occurring at speeds beyond a 200 or 300 km/h. Furthermore, a power deployment of the vehicle, i.e. a final speed or an accelerating ability, may be reduced considerably due to an aerodynamically unfavorable shaping of a vehicle.

Forces occurring at high speeds can deform or damage parts of the vehicle. Deformations of this type may be particularly pronounced in the case of relatively filigree structures, such as a ventilation grille or air guiding slat. Transverse or longitudinal webs are reinforcing elements that can absorb the corresponding forces and thereby prevent deformation of the air guiding slats. However, said structures generally do not serve any function other than stabilizing the air guiding slats, and therefore are unsuitable for aerodynamically optimizing the vehicle.

The air inlet opening of the invention makes it possible to arrange or integrate air guiding slats in a vehicle in such a manner that it is possible to dispense with retaining structures, such as longitudinal or transverse webs for supporting the slats. A retaining frame is integrated into the front cowling of a vehicle and slats are arranged in the retaining frame. Thus, forces that act on the slats can be dissipated efficiently via the retaining frame or via bearing points or mounts in the retaining frame into the front cowling that surrounds the retaining frame. Connecting the retaining frame to the front cowling enables an efficient frictional connection between the slats, the retaining frame and the front cowling of the vehicle. Thus, additional stabilizing elements, such as horizontal or vertical webs for stabilizing the slats, become partially superfluous.

Forces caused by air approaching the front cowling and the vehicle itself are dissipated efficiently so that the slats of the air guiding device can be kept closed or sealed even at very high speeds. Therefore an approach of the ambient medium, i.e. air or wind, can be kept away before the ambient medium enters the vehicle or the air inlet opening of the vehicle. The tight closure of the air inlet opening by the slats enables the approaching relative winds to be guided around the vehicle. As a result, an aerodynamic drag of the vehicle or a value for the coefficient of drag of the vehicle is reduced considerably.

Reducing the aerodynamic drag of the vehicle improves energy efficiency of the vehicle. An air flow that is dissipated via the at least one closed slat also enables air flow to be guided past the vehicle in such a manner that driving-dynamics properties of the vehicle are optimized. Thus, for example, a contact pressure of the vehicle against the road is increased. The approaching air flow that is conducted away by the at least one slat, can be supplied to further air guiding devices, for example for cooling a vehicle brake.

The at least one slat that is encompassed by the air guiding device may have at least one position to tightly close the air inlet opening to the outside, i.e. toward a side facing away from a vehicle interior. A tight closure is to be understood as meaning a closure that, to the extent technically possible, protects a space located behind the closure of the at least one slat before ambient medium or air flows through the space.

The at least one slat can be manufactured from metal, plastic, carbon, a composite material or any other technically suitable material for dissipating relative wind or air. Furthermore, the slat can be arranged horizontally, vertically or in any other orientation within the retaining frame. The at least one slat also may comprise a plurality of layers and/or openings.

The retaining frame can be made from metal, plastic, carbon, a composite material or any other technically suitable material for dissipating relative wind or air.

The retaining frame may comprise transverse and/or longitudinal struts for stabilization.

Stabilizing elements, such as, transverse and/or longitudinal struts, may be behind the at least one slat to reduce an aerodynamic drag of the stabilizing elements, optionally by closing the air guiding device by means of a changed angle of incidence of the at least one slat, and to protect the stabilizing elements from an air flow.

The at least one slat of the air guiding device may be adjustable to have an angle of incidence that is a function of a vehicle speed.

A vehicle speed that is suitable for adjusting or opening the at least one slat may be a vehicle speed of 130 km/h.

At speeds of >130 km/h, the vehicle is supplied with large amounts of air or relative wind, for example through additional openings. Therefore, it is conceivable to close the at least one slat when the 130 km/h threshold is reached and thereby to improve the vehicle aerodynamics.

For the situation in which the vehicle nevertheless requires additional cooling, the at least one slat can be opened again at any time, for example as a function of a coolant temperature.

It may also be expedient to close the at least one slat at speeds below 130 km/h to avoid damage, for example due to objects in town traffic, and to pen the at least one slat at speeds of >130 km/h to supply the vehicle with additional air for cooling.

At a suitable vehicle speed, both the air guiding device of the invention may be activated so that the at least one slat changes in the angle of incidence, and also at least one further aerodynamically relevant part, such as, a rear spoiler, changes in the position thereof. Thus, the entire vehicle is changed into a high speed mood, in which aerodynamic properties and optionally further driving-dynamics properties of the vehicle are adapted or optimized to travel at a high or very high speed.

The vehicle speed closely relates to a power generated by an engine or motor of a vehicle and with waste heat of the engine of the vehicle. Thus, it may be advantageous, in the event of increased waste heat, i.e. when the vehicle engine outputs a high power, for the at least one slat to guide an increased air flow through the air guiding device to withdraw heat from a heat exchanger or radiator and to cool same.

A readjustment of the air guiding device after the angle of incidence of the at least one slat has been adjusted may be possible only after a period of time to be determined has elapsed.

To avoid continuous or repeated adjustment of the at least one slat by the servo motor, sequentially adjustments in the angle of incidence thereof may be made only after a selected period of time (t) if speeds or coolant temperatures or waste heat values are close to a respective limit value for adjusting the at least one slat encompassed by the air guiding device. The period of time (t) may be selected as a function of a vehicle speed and/or coolant temperature. Furthermore, the period of time (t) may be defined fixedly. Suitable values for a possible period of time (t) are, for example, 3 s, 10 s or 100 s.

The at least one slat may comprise at least one strut that connects the at least one slat to the retaining frame.

The at least one slat may be arranged horizontally in the retaining frame and may be fixed by the retaining frame and an adjusting mechanism of the servo motor.

Retaining webs or struts for supporting the at least one slat can be dispensed with by connecting the at least one slat to the retaining frame. To this end, provision is made for a transverse strut to be arranged within the at least one slat. The transverse strut may be suitable for connection to suitable bearing points within the retaining frame. The transverse strut can be made from metal, plastic, carbon, a composite material or any other technically suitable material for connecting to the retaining frame. Furthermore, the horizontal struts encompassed by the at least one slat can be suitable for connecting the at least one slat to an adjusting mechanism of a servo motor. It is consequently possible, by driving the servo motor, to operate the adjusting mechanism in such a manner that the at least one slat is changed in the angle of incidence thereof in such a manner that an airflow approaching the at least one slat is guided increasingly through the air guiding device or around the vehicle.

The servo motor may be an electrically operated motor. An electric servo motor can have a very precise and rapid effect on the adjusting mechanism, and therefore control commands transmitted from a control unit to the electric motor can be implemented precisely and rapidly.

The invention also relates to a method for closing at least one air inlet opening that is arranged laterally in a front cowling on a vehicle and is surrounded by a retaining frame that bears at least one slat that is visible from the outside. The slat is mounted movably within the retaining frame, and therefore, in a closed position, the air inlet opening is closed tightly to the outside by the at least one slat, and, in at least one open position, the air inlet opening is permeable to air for cooling a radiator arranged behind the retaining frame. The at least one slat can be adjusted in the angle of incidence by an electric drive.

The method is operative to dynamically optimize, i.e. adapt, aerodynamic properties of a vehicle as a function of a requirement for cooling air and/or a speed of the vehicle.

The method may activate further aerodynamic and/or driving-dynamics elements of a vehicle in such a manner that respective driving properties of the vehicle are optimized, i.e., for example, are adapted to high speeds.

The at least one slat can be changed in the angle of incidence thereof as a function of a position of a further aerodynamic part of the vehicle.

By coordination of the angle of incidence of the at least one slat with further air guiding devices, such as a spoiler, and/or with further driving-dynamics components, such as, for example, a chassis or the like, it is possible to set the entire vehicle into a state that is optimized to high speeds and in which aerodynamic and/or driving-dynamics components of the vehicle are changed as a function of one another in such a manner that an accelerating ability and/or a final speed of the vehicle are/is maximized.

The features mentioned above can be used in the stated combination, and also in different combinations or on their own without departing from the scope of the invention. The invention is illustrated schematically with reference to embodiments in the drawings and is described in detail with reference to the drawings.

DETAILED DESCRIPTION

Figure 1:
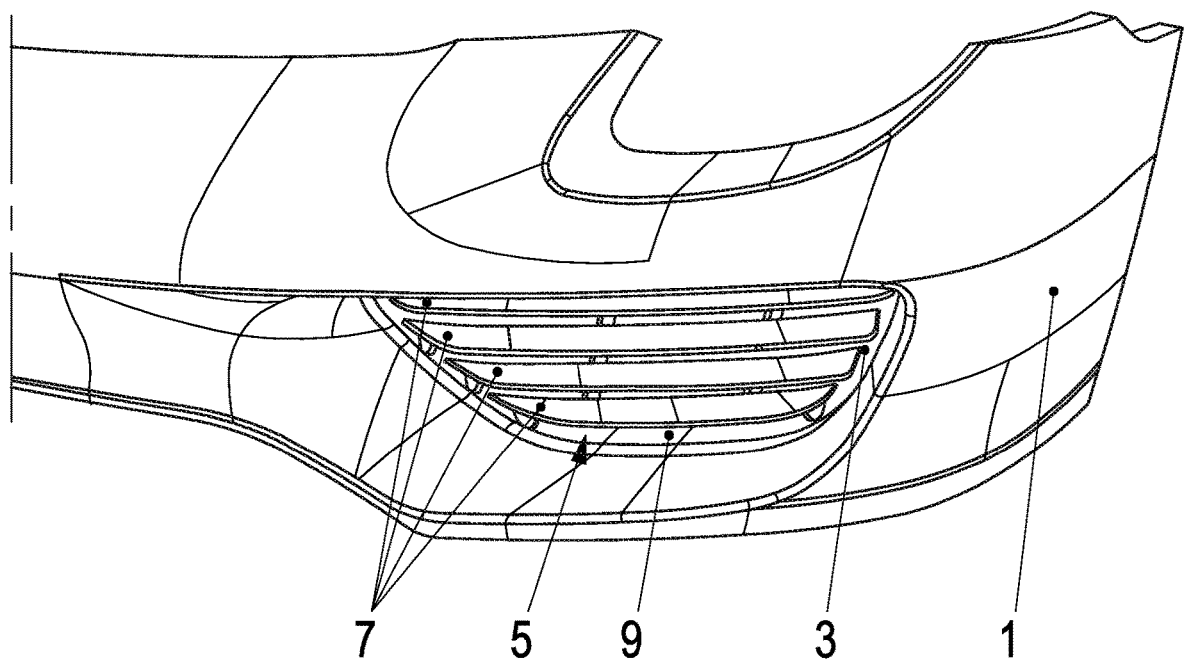
FIG. 1 shows one embodiment of the invention with open slats.

FIG. 1 shows a front cowling 1 of a vehicle with an air inlet opening 3 that is encompassed by the front cowling 1 and, can be shielded to the outside by an air guiding device 5. The air guiding device 5 comprises slats 7 and a retaining frame 9. The slats 7 are mounted movably in the retaining frame 9 so that the slats 7 are changeable in the angle of incidence thereof and, as a result, a volume of air flowing through the air inlet opening 3 can be regulated, i.e. limited, reduced or increased. In the state illustrated in FIG. 1, the slats 7 are open, as a result of which an air volume flowing through the air inlet opening 3 is maximized and can be used for cooling the vehicle.

Figure 2:
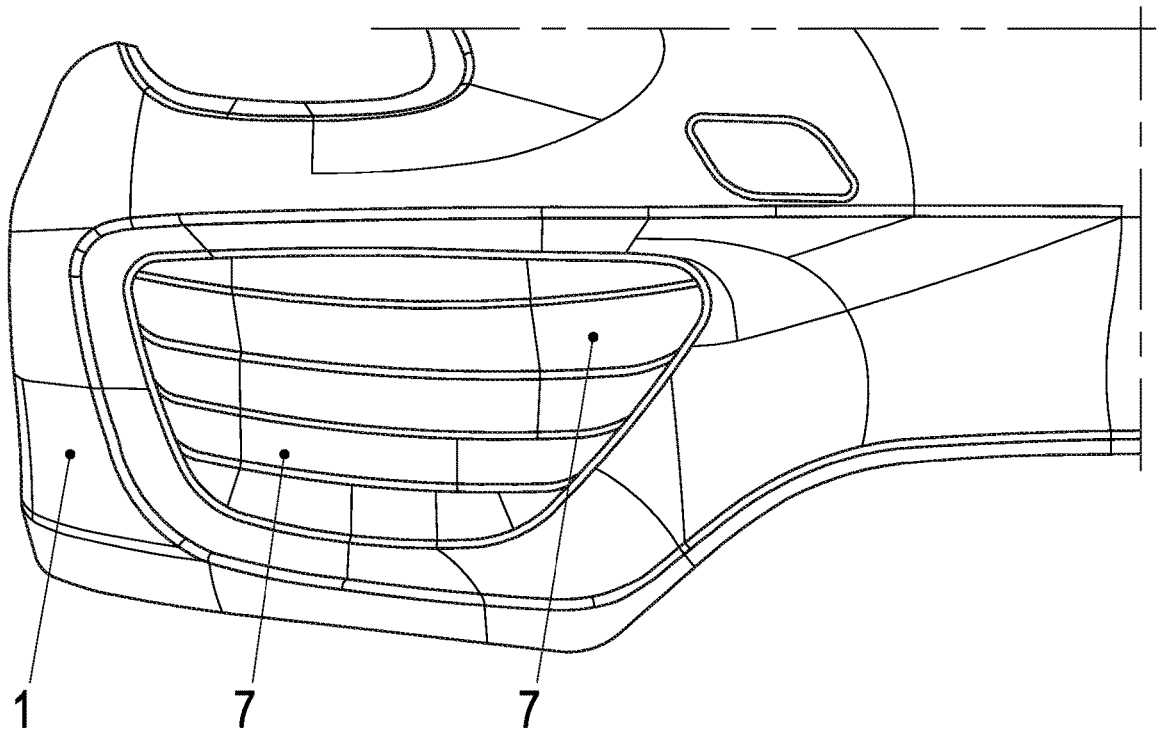
FIG. 2 shows the embodiment of FIG. 1 with closed slats.

FIG. 2 shows the slats 7 of FIG. 1, in a closed position, as a result of which the air inlet opening 3 located behind the slats 7 is closed tightly and approaching air, i.e. relative wind, is prevented, as far as technically possible, from flowing through the air inlet opening 3. Using the slats 7 to close the air inlet opening 3 causes the approaching air to be guided around the air inlet opening 3 and the slats 7 and hence the air is dissipated along the front cowling 1 of the vehicle. Dissipation of the approaching air and of the force associated therewith by the front cowling 1 or by the vehicle reduces an aerodynamic drag caused by the approaching air, and the force that acts on the vehicle. Thus, movement of the vehicle through the air surrounding the vehicle is made easier.

Figure 3:
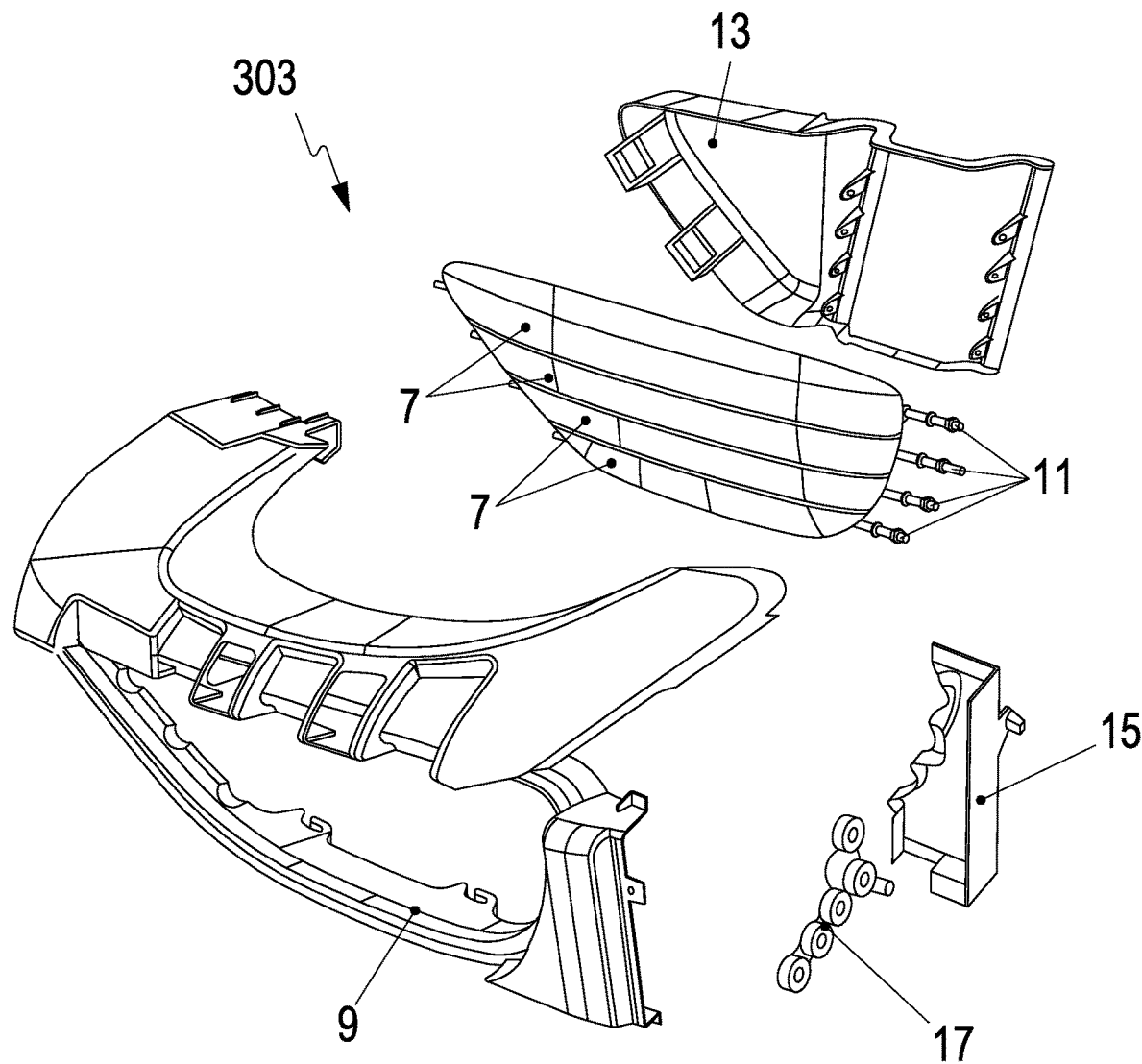
FIG. 3 shows a schematic construction of an embodiment of the invention.

FIG. 3 shows the schematic construction of an air guiding device 303 that includes the retaining frame 9 with receptacles or bearing points for struts 11 that are integrated in the slats 7 and fix the slats 7 in the retaining frame 9. Furthermore, an air blade 13 optionally can be provided behind the slats 7. The air blade 13 efficiently guides an air flow through the slats 7 to locations in the vehicle at which fresh air is required, for example for cooling purposes. A drive 15 is provided in the air guiding device 303 to change the angle of incidence of the slats 7. The drive 15 interacts with the slats 7 via an adjusting mechanism 17 and moves the slats 7 as a function of control signals of a control unit.

Figure 4:
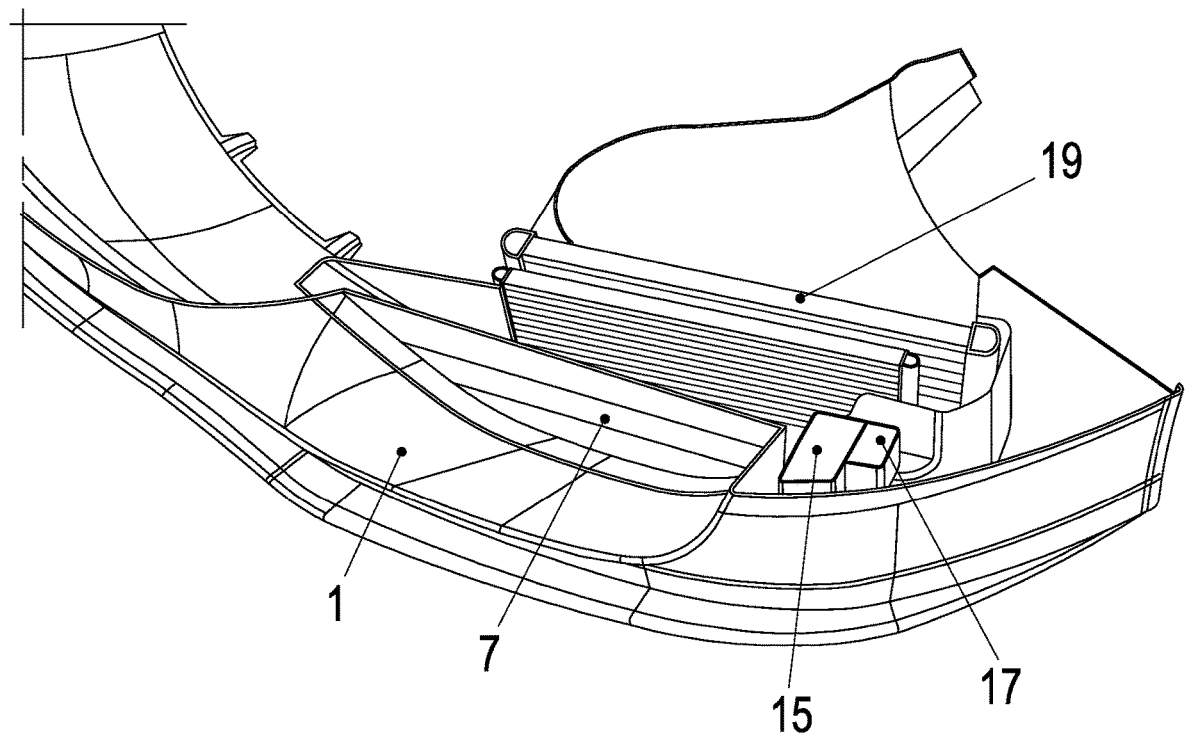
FIG. 4 shows a possible arrangement of one possible embodiment of the invention with a radiator.

FIG. 4 also shows a radiator or heat exchanger 19 that is cooled by approaching ambient air. Accordingly, a cooling power of the radiator 19 is related to a volume of air or relative wind flowing through the slats 7. If the radiator 19 has to conduct away a high mass of waste heat, it is possible to move the slats 7 by means of the drive 15 and the adjusting mechanism 17 so that a volume of air flowing through the air inlet opening 3 is increased. As a result, the waste heat can be conducted away efficiently by the radiator. If the waste heat generated is reduced again and, for example, drops below a defined threshold value, the slats 7 can be moved back again into a closed position and aerodynamic properties of the vehicle are thereby improved.

The slats 7 are in the visible region and hence are in a zone directly acted upon by the relative wind even before the relative wind enters the vehicle. Thus, the relative wind can optionally be deflected or guided around the vehicle. As a result, both the aerodynamic drag and the aerodynamics of the respective vehicle are improved. Furthermore, via a deflection of the relative wind around the vehicle, a penetration of the relative wind into the vehicle, in which there are no aerodynamically favorable conditions, as a result of which an aerodynamic drag is possibly considerably increased, for example, because of sharp edges and/or concave structures, is prevented. An early dissipation of the relative wind over a streamlined vehicle covering, such as, for example, the front cowling 1, causes efficient sliding of the vehicle through an amount of air surrounding the vehicle and stabilization of the vehicle when suitable spoilers and air guiding devices are used.

Figure 5:
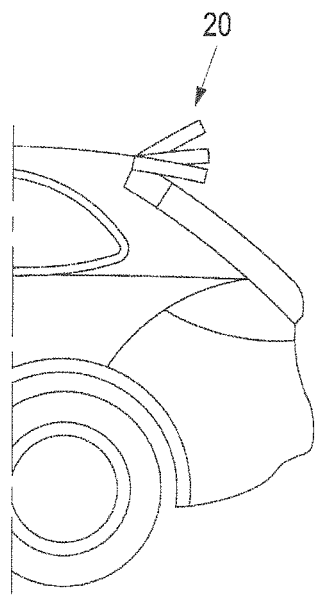
FIG. 5 is a schematic side elevational view of a vehicle that has a rear spoiler in addition to the air guiding device of FIGS. 1-4.

At a suitable vehicle speed, both the air guiding device 5 of FIGS. 1-4 may be activated so that the at least one slat 7 changes in the angle of incidence, and also at least one further aerodynamically relevant part, such as, a rear spoiler 20, changes in the position thereof, as shown in FIG. 5. Thus, the entire vehicle is changed into a high speed mood, in which aerodynamic properties and optionally further driving-dynamics properties of the vehicle are adapted or optimized to travel at a high or very high speed.

What is claimed is:

1. A method for controlling an air flow in proximity to a front cowling on a vehicle, the front cowling having opposite exterior and interior surfaces and an air inlet opening extending through the front cowling from the exterior surface to the interior surface and the air inlet opening is surrounded by a retaining frame that bears movable slats that are mounted movably within the retaining frame between: an open position where the air inlet opening is permeable to air approaching the air inlet opening for cooling a radiator arranged behind the retaining frame, and a closed position where the slats completely cover the air inlet opening and guide the air approaching the air inlet opening around the exterior of the front cowling, wherein the method comprises:

sensing a speed of the vehicle;

sensing a temperature of a coolant in the radiator behind the retaining frame;

using an electric drive for moving the slats from the open position to the closed position if:

the sensed speed of the vehicle exceeds a threshold value, the sensed temperature of the coolant does not exceed a coolant temperature threshold value, and a predetermined time between successive movements of the slats has elapsed;

using the electric drive for moving the slats from the closed position to the open position if:

the sensed temperature of the coolant exceeds the coolant temperature threshold value, and the predetermined time between the successive movements of the slats has elapsed; and keeping the slats at an existing open or closed position if the predetermined time between the successive movements of the slats has not elapsed.

2. The method of claim 1, wherein the elapsed time is 3 seconds.

3. The method of claim 1, wherein the elapsed time is 10 seconds.

4. The method of claim 1, wherein the elapsed time is 100 seconds.

5. The method of claim 1, wherein an angle of incidence of the slats further is changed as a function of a position of a further aerodynamic part of the vehicle.

* * * * *